(12) United States Patent
Liu

(10) Patent No.: US 8,154,882 B2
(45) Date of Patent: Apr. 10, 2012

(54) COMPUTER SYSTEM AND MOTHERBOARD AND MONITOR THEREOF

(75) Inventor: Yi-Hong Liu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 374 days.

(21) Appl. No.: 12/611,879

(22) Filed: Nov. 3, 2009

(65) Prior Publication Data
US 2011/0072252 A1 Mar. 24, 2011

(30) Foreign Application Priority Data
Sep. 23, 2009 (CN) .......................... 2009 1 0307492

(51) Int. Cl.
*H05K 1/14* (2006.01)
(52) U.S. Cl. ........................................ 361/803; 361/788

(58) Field of Classification Search .................. 361/803, 361/778, 788; 710/313
See application file for complete search history.

(56) References Cited

U.S. PATENT DOCUMENTS

| | | | | |
|---|---|---|---|---|
| 6,624,797 | B1 * | 9/2003 | Wheeler et al. ................ | 345/1.2 |
| 8,049,781 | B2 * | 11/2011 | Liu et al. ..................... | 348/207.1 |
| 2009/0300252 | A1 * | 12/2009 | Liu et al. ...................... | 710/302 |
| 2011/0107125 | A1 * | 5/2011 | Zhou ............................ | 713/310 |

* cited by examiner

*Primary Examiner* — Dameon Levi
(74) *Attorney, Agent, or Firm* — Altis Law Group, Inc.

(57) ABSTRACT

A first terminal of a first switch, a first idling pin, a third idling pin, and a power pin are connected together. A second terminal of the first switch, a first ground pin, a second ground pin, and a third ground pin are electrically connected together. A first terminal of the second switch, a second idling pin, a fourth idling pin, and a reset pin are electrically connected together. A second terminal of the second switch, a first ground pin, a second ground pin, and a third ground pin are electrically connected together. The first switch controls the motherboard to power on or power off, and the second switch controls the motherboard to reset.

8 Claims, 3 Drawing Sheets

COMPUTER SYSTEM AND MOTHERBOARD AND MONITOR THEREOF

BACKGROUND

1. Technical Field

The present disclosure relates to a computer system, and a motherboard and a monitor of the computer system.

2. Description of Related Art

Nowadays, computers are widely used by people for word processing, multimedia playing, and accessing the Internet for both research and communications. A user of the computer must press the power button or the restart button of the host computer, to power on or restart the computer system. However, when the host computer is placed in a remote location from the monitor of the computer system, such a way of starting and restarting by pressing the power button or the restart button of the host computer would be inconvenient.

DETAILED DESCRIPTION

Figure 1:
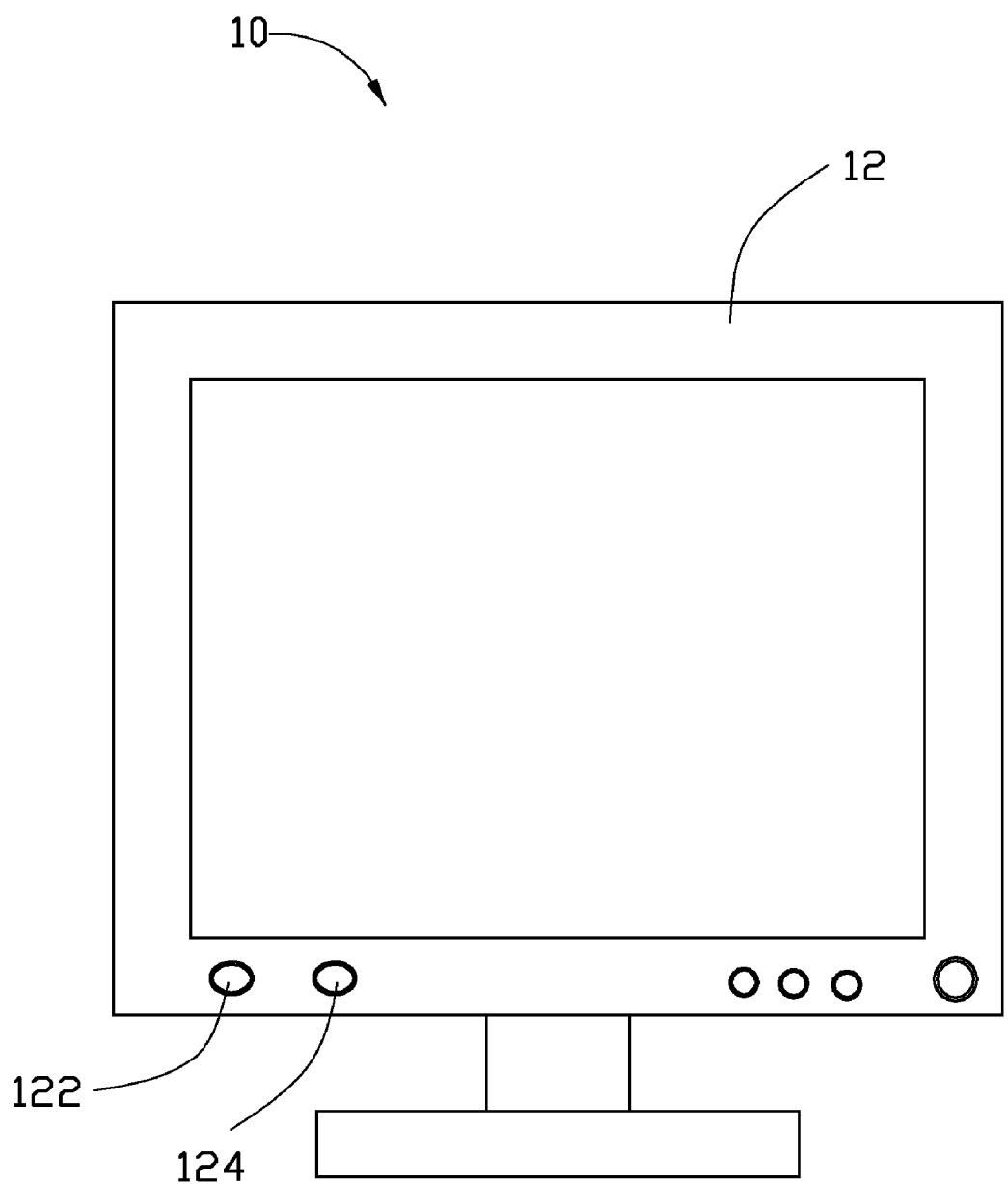
FIG. 1 is schematic diagram of a first exemplary embodiment of a monitor of a computer system.
Figure 2:
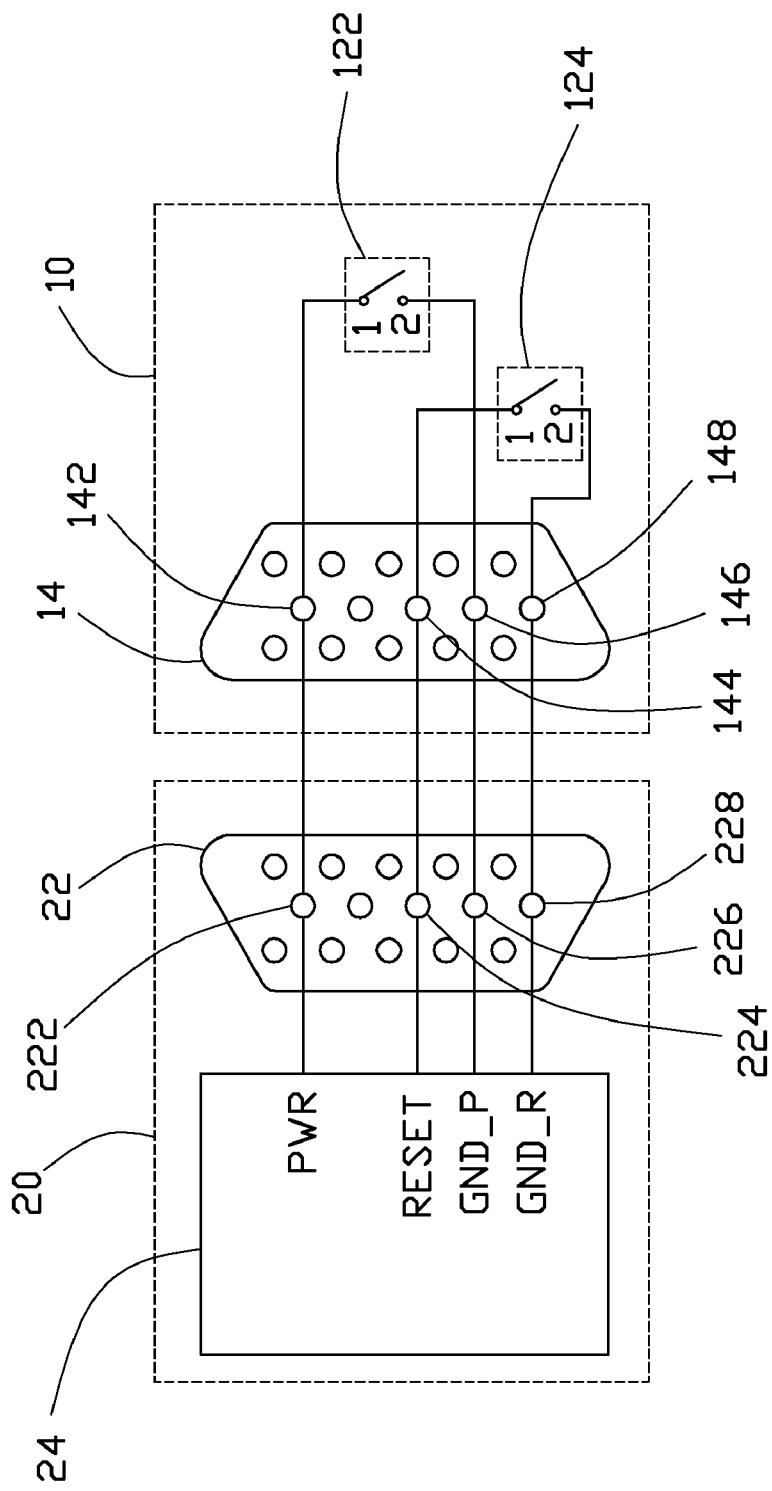
FIG. 2 is a circuit diagram of a first exemplary embodiment of a motherboard and the monitor of the computer system of FIG. 1.

Referring to FIGS. 1 and 2, a first exemplary embodiment of a computer system includes a monitor 10 and a motherboard 20.

The monitor 10 includes a display screen 12, a video connector 14, and two switches 122, 124. The video connector 14 is a video graphics array (VGA) connector, and includes two idling pins 142 and 144, two ground pins 146 and 148. The switches 122 and 124 each includes a button set on an outside surface of the display screen 12.

The motherboard 20 includes a video connector 22 and a control connector 24. The video connector 22 includes two idling pins 222 and 224, corresponding to the idling pins 142 and 144 of the video connector 14, and two ground pins 226 and 228. The control connector 24 is a plug, and connected to a power switch and a restart switch of the computer system. The control connector 24 includes a power pin PWR, a reset pin RESET, two ground pins GND_P and GND_R.

The video connector 14 is connected to the video connector 22 via a VGA cable. The video connector 14 is connected to the switches 122 and 124 via wires. The video connector 22 is electrically connected to the control connector 24 via copper foils of the motherboard 20. The first terminal 1 of the switch 122, the idling pins 142 and 222, and the power pin PWR are connected together. The second terminal 2 of the switch 122, the grounds pin 146, 226, and GND_P are electrically connected together. The first terminal 1 of the switch 124, the idling pins 144 and 224, and the reset pin RESET are electrically connected together. The second terminal 2 of the switch 124, the ground pins 148, 228, and GND_R are electrically connected together.

If the motherboard 20 is in a close state, when the first switch 122 is pressed, the power pin PWR is at a low level, the motherboard 20 is powered on. If the motherboard 20 is in a start state, when the second switch 124 is pressed, the reset pin RESET is at a low level, the motherboard 20 is reset. When the switch 122 is pressed for several seconds, the power pin PWR maintains at a low level, the motherboard 20 is powered off. Functions of the switches 122 and 124 are similar to the power switch and the reset switch of the conventional host computer.

Figure 3:
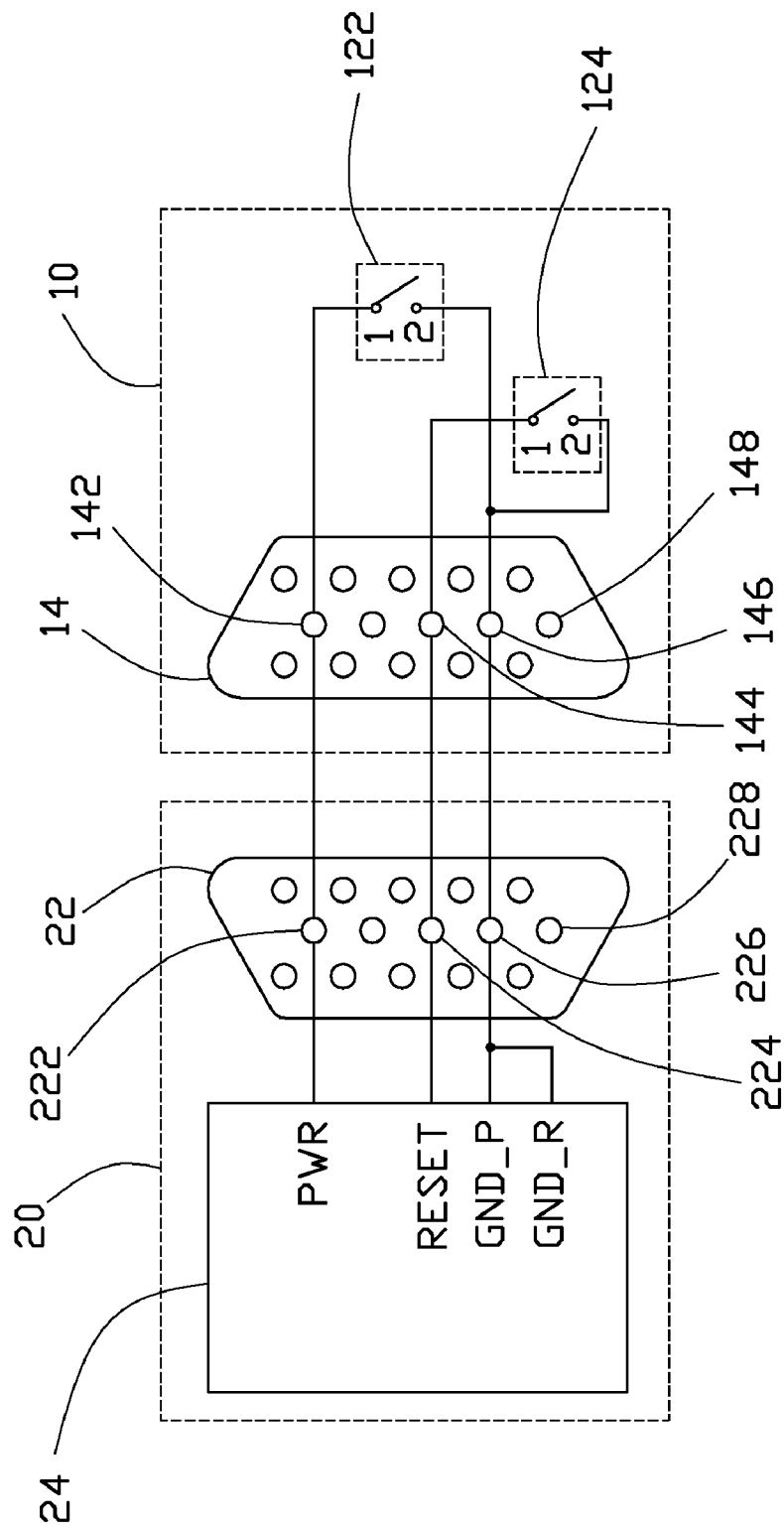
FIG. 3 is a circuit diagram of a second exemplary embodiment of a motherboard and a monitor of a computer system.

FIG. 3 illustrates a second exemplary embodiment of the computer system. The difference between the first and second exemplary embodiments is as follow:

The second terminals 2 of the switches 122 and 124 are connected together, and then connected to the ground pin 146 of the video connector 14. The ground pins GND_P and GND_R of the control connector 24 are connected together, and then connected to the ground pin 226 of the video connector 22. The ground pin 146 of the video connector 14 is electrically connected to the ground pin 226 of the video connector 22. The ground pin 148 of the video connector 14 and the ground pin 228 of the video connector 22 are idle.

In other embodiments, the video connectors 14 and 22 can be designed according to need. The video connectors 14 and 22 each includes idling pins and ground pins, which are electrically connected to the power pin PWR and the reset pin RESET of the control connector 24. The switches 122 and 124 may be other switches, such as infrared electronic switches. The switches 122 and 124 are electrically connected to the power pin PWR and the reset pin RESET of the control connector 24 of the motherboard 20 via the idling pins of the video connectors 14 and 22.

The computer system controls input signals of the power pin PWR and the reset pin RESET of the control connector 24 via the switches 122 and 124, to further control the motherboard 20 to power on, power off, or reset. Therefore, the computer system can be operated conveniently.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching. The embodiments were chosen and described in order to explain the principles of the disclosure and their practical application so as to enable others skilled in the art to utilize the disclosure and various embodiments and with various modifications as are suited to the particular use contemplated. Alternately embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A computer system comprising:
   a monitor comprising:
      a display screen;
      a first switch and a second switch set on the display screen; and
      a first video connector comprising:
         a first idling pin;
         a second idling pin; and
         at least one first ground pin; and
   a motherboard comprising:
      a second video connector comprising:
         a third idling pin;
         a fourth idling pin; and
         at least one second ground pin; and
      a controlling connector comprising:
         a power pin;
         a reset pin; and
         at least one third ground pin;

wherein the first terminal of the first switch, the first idling pin, the third idling pin, and the power pin are connected together, the second terminal of the first switch, one of the at least one first ground pin, one of the at least one second ground pin, and one of the at least one third ground pin are electrically connected together, the first terminal of the second switch, the second idling pin, the fourth idling pin, and the reset pin are electrically connected together, the second terminal of the second switch, one of the at least one first ground pin, one of the at least one second ground pin, and one of the at least one third ground pin are electrically connected together, the first switch controls the motherboard to power on or power off, and the second switch controls the motherboard to reset.

2. The computer system of claim 1, wherein the first video connector and the second video connector are video graphics array connectors.

3. The computer system of claim 1, wherein the first switch and the second switch each comprise a button set on an outside surface of the monitor.

4. A monitor comprising:
a display screen;
a first switch;
a second switch; and
a video connector comprising:
 a first idling pin;
 a second idling pin; and
 at least one ground pin;
wherein a first terminal of the first switch is connected to the first idling pin, a second terminal of the first switch is connected to one of the at least one ground pin, a first terminal of the second switch is connected to the second idling pin, a second terminal of the second switch is connected to one of the at least one ground pin, the video connector is connected to a motherboard of a computer, the first switch controls the motherboard to power on or power off, and the second switch controls the motherboard to reset.

5. The monitor of claim 4, wherein the video connector is a video graphics array connector.

6. The monitor of claim 4, wherein the first switch and the second switch each comprise a button set on an outside surface of the monitor.

7. A motherboard comprising:
a video connector comprising:
 a first idling pin;
 a second idling pin; and
 at least one ground pin; and
a control connector comprising:
 a power pin;
 a reset pin; and
 at least one second ground pin;
wherein the first idling pin is electrically connected to the power pin, the second idling pin is electrically connected to the reset pin, one of the at least one first ground pin is connected to one of the at least one second ground pin, the video connector is connected to a monitor, two switches of the monitor controls input signals of the power pin and the reset pin of the motherboard to control the motherboard to power on, power off, or reset.

8. The motherboard of claim 7, wherein the video connector is a video graphics array connector.

* * * * *